(12) United States Patent
Park et al.

(10) Patent No.: US 10,822,494 B2
(45) Date of Patent: Nov. 3, 2020

(54) POLYCARBONATE RESIN COMPOSITION AND MOLDED PRODUCT USING THE SAME

(71) Applicant: Lotte Advanced Materials Co., Ltd., Yeosu-si (KR)

(72) Inventors: Jungeun Park, Uiwang-si (KR); Keehae Kwon, Uiwang-si (KR); Heeyun Jeong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 35 days.

(21) Appl. No.: 16/233,685

(22) Filed: Dec. 27, 2018

(65) Prior Publication Data

US 2019/0203042 A1   Jul. 4, 2019

(30) Foreign Application Priority Data

Dec. 29, 2017   (KR) .................. 10-2017-0184919

(51) Int. Cl.
| | |
|---|---|
| *C08L 69/00* | (2006.01) |
| *C08L 67/03* | (2006.01) |
| *C08L 33/14* | (2006.01) |
| *C08L 33/08* | (2006.01) |
| *C08L 23/08* | (2006.01) |

(52) U.S. Cl.
CPC ............... *C08L 69/00* (2013.01); *C08L 23/08* (2013.01); *C08L 23/0884* (2013.01); *C08L 33/08* (2013.01); *C08L 33/14* (2013.01); *C08L 67/03* (2013.01); *C08L 2205/03* (2013.01); *C08L 2205/035* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 7,893,135 B2 | 2/2011 | Moulinie et al. | |
| 2010/0119750 A1 | 5/2010 | Okamoto et al. | |
| 2012/0129989 A1 | 5/2012 | Kim et al. | |
| 2012/0289655 A1* | 11/2012 | Sumita | C08G 63/85 525/67 |

FOREIGN PATENT DOCUMENTS

| | | |
|---|---|---|
| JP | 08-325443 A | 12/1996 |
| JP | 11-060857 A | 3/1999 |
| JP | 11116782 | * 4/1999 |
| JP | 2000-248148 A | 9/2000 |
| JP | 2000-273255 A | 10/2000 |
| JP | 2000-313781 A | 11/2000 |
| JP | 2001-011282 A | 1/2001 |
| JP | 2009-007559 A | 1/2009 |
| JP | 2011-516641 A | 5/2011 |
| KR | 10-1995-0001641 B1 | 2/1995 |
| KR | 10-0149247 B1 | 5/1997 |
| KR | 10-2008-0045798 A | 9/2009 |
| KR | 10-1212673 B1 | 2/2011 |
| KR | 10-2011-0066556 A | 2/2013 |
| KR | 10-2014-0118953 A | 7/2015 |
| KR | 10-1766038 B1 | 8/2017 |
| KR | 10-2016-0123984 A | 9/2018 |

* cited by examiner

*Primary Examiner* — David J Buttner
(74) *Attorney, Agent, or Firm* — Additon, Higgins & Pendleton, P.A.

(57) ABSTRACT

A thermoplastic resin composition includes about 100 parts by weight of a base resin including (A) about 70 wt % to about 90 wt % of a polycarbonate resin, and (B) about 10 wt % to about 30 wt % of a polyethylene terephthalate resin, (C-1) about 1 to about 10 parts by weight of a first viscosity reinforcing agent having a core-shell structure including a rubbery polymer core and a shell formed by grating a monomer having compatibility with the polycarbonate resin (A), (C-2) about 1 to about 10 parts by weight of a second viscosity reinforcing agent having a core-shell structure including a rubbery polymer core and a shell formed by grafting a monomer having compatibility with the polyethylene terephthalate resin (B), and about 1 to about 10 parts by weight of an alkyl acrylate copolymer including a glycidyl methacrylate functional group.

17 Claims, No Drawings

POLYCARBONATE RESIN COMPOSITION AND MOLDED PRODUCT USING THE SAME

CROSS-REFERENCE TO RELATED APPLICATION

This application claims priority to and the benefit of Korean Patent Application No. 10-2017-0184919 filed in the Korean Intellectual Property Office on Dec. 29, 2017, the entire disclosure of which is incorporated herein by reference.

FIELD

The present disclosure relates to a thermoplastic resin composition and a molded product using the same.

BACKGROUND

A polycarbonate resin is widely used as one of engineering plastics in a plastic industry.

Polycarbonate resin has a glass transition temperature (Tg) reaching about 150° C. due to a bulky molecular structure such as derived from bisphenol-A and thus can have high heat resistance. Polycarbonate resin can also have flexibility and rigidity given by a carbonyl group of a carbonate group having high rotating mobility. In addition, the polycarbonate resin is an amorphous polymer and thus can have excellent transparency characteristics. Polycarbonate resin further can have excellent impact resistance and compatibility with other resins and the like.

Polycarbonate resin, however, can exhibit deteriorated fluidity and thus, may also be largely used as alloys with various resins in order to complement workability and post-processibility.

Polycarbonate resins are widely used as materials for replacing metals in automotive parts, which have recently become lightweight. However, due to the high temperature external environment due to for example global warming, building radiant heat, and engine heat of vehicles, there have been efforts to solve problems of thermal deformation after mounting the automotive part on the automobile.

Accordingly, there is a need for a thermoplastic resin composition having high heat resistance, excellent formability, and/or high impact resistance for use in the manufacture of automotive parts.

SUMMARY OF THE INVENTION

The present disclosure provides a thermoplastic resin composition that can exhibit stable blow molding formability and/or high impact properties at the junction part by strengthening welding properties, and a molded product made using the same.

A thermoplastic resin composition according to an embodiment includes about 100 parts by weight of a base resin including (A) about 70 wt % to about 90 wt % of a polycarbonate resin, and (B) about 10 wt % to about 30 wt % of a polyethylene terephthalate resin, (C-1) about 1 to about 10 parts by weight of a first viscosity reinforcing agent having a core-shell structure including a rubbery polymer core formed by polymerization of a diene-based monomer and a shell formed by grafting a monomer having compatibility with the polycarbonate resin (A) and being different from the diene-based monomer, (C-2) about 1 to about 10 parts by weight of a second viscosity reinforcing agent having a core-shell structure including a rubbery polymer core formed by polymerization of a diene-based monomer and a shell formed by grafting a monomer having compatibility with the polyethylene terephthalate resin (B) and being different from the diene-based monomer, and (D) about 1 to about 10 parts by weight of an alkyl acrylate copolymer including a glycidyl methacrylate functional group.

A molded product according to another embodiment includes the thermoplastic resin composition.

The thermoplastic resin composition according to an embodiment can exhibit stable blow molding formability and/or may make it possible to produce a molded product capable of exhibiting high impact characteristics at the junction part by strengthening welding properties.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to an embodiment includes about 100 parts by weight of a base resin including (A) about 70 wt % to about 90 wt % of a polycarbonate resin, and (B) about 10 wt % to about 30 wt % of a polyethylene terephthalate resin, (C-1) about 1 to about 10 parts by weight of a first viscosity reinforcing agent having a core-shell structure including a rubbery polymer core formed by polymerization of a diene-based monomer and a shell formed by grafting a monomer having compatibility with the polycarbonate resin (A) and being different from the diene-based monomer, (C-2) about 1 to about 10 parts by weight of a second viscosity reinforcing agent having a core-shell structure including a rubbery polymer core formed by polymerization of a diene-based monomer and a shell formed by grafting a monomer having compatibility with the polyethylene terephthalate resin (B) and being different from the diene-based monomer, and (D) about 1 to about 10 parts by weight of an alkyl acrylate copolymer including a glycidyl methacrylate functional group.

Hereinafter, each component included in the thermoplastic resin composition is described in detail.

(A) Polycarbonate Resin

The polycarbonate resin is a polyester having a carbonate bond, is not particularly limited, and may be any polycarbonate that is usable in a field of a resin composition.

For example, the polycarbonate resin may be prepared by reacting a diphenol(s) represented by Chemical Formula 1 with phosgene, halogenic acid ester, carbonate ester, or a combination thereof.

[Chemical Formula 1]

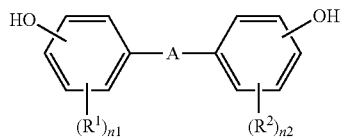

In Chemical Formula 1,

A is a linking group selected from a single bond, a substituted or unsubstituted C1 to C30 alkylene group, a substituted or unsubstituted C2 to C5 alkenylene group, a substituted or unsubstituted C2 to C5 alkynylene group, a substituted or unsubstituted C5 to C6 cycloalkylene group, a substituted or unsubstituted C5 to C6 cycloalkenylene group, a substituted or unsubstituted C5 to C10 cycloalkynylene group, a substituted or unsubstituted C6 to C30 arylene group, carbonyl group, —C(X)C(=O)O— (wherein, X is a halogen), —C(=O)O—, —C(=O)NH—, —OC(=O)O—, —S—, —S(=O)$_2$—, or a combination thereof, $R^1$ and $R^2$ are the same or different and are each independently a substituted or unsubstituted C1 to C30 alkyl group or a substituted or unsubstituted C6 to C30 aryl group, and n1 and n2 are the same or different and are each independently an integer ranging from 0 to 4.

Two or more kinds of the diphenols represented by Chemical Formula 1 may be combined to constitute a repeating unit of a polycarbonate resin.

Examples of the diphenols may include without limitation 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof.

The diphenol can include, for example, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis(4-hydroxyphenyl)cyclohexane, for example, 2,2-bis(4-hydroxyphenyl)propane.

Examples of the polycarbonate resin can include without limitation linear polycarbonate resins, branched polycarbonate resins, polyestercarbonate copolymer resins, and the like, and combinations thereof.

Examples of the linear polycarbonate resin may include without limitation a bisphenol-A polycarbonate resin. Examples of the branched polycarbonate resin may include without limitation a polymer prepared by reacting a multi-functional aromatic compound such as trimellitic anhydride, trimellitic acid, and the like with a diphenol(s) and a carbonate. The polyester carbonate copolymer resin may be prepared by reacting bifunctional carboxylic acid with a diphenol(s) and carbonate, wherein the carbonate can be, for example, diaryl carbonate such as diphenyl carbonate and/or ethylene carbonate.

The polycarbonate resin may be a branched polycarbonate resin. The branched polycarbonate can have viscosity appropriate for a blow molding.

The polycarbonate resin may have a weight average molecular weight of about 10,000 g/mol to about 200,000 g/mol, for example, about 14,000 g/mol to about 40,000 g/mol. When the weight average molecular weight of the polycarbonate resin is within the above ranges, excellent impact resistance and/or fluidity may be obtained.

The base resin can include the polycarbonate resin in an amount of about 70 wt % to about 90 wt %, for example about 70 wt % to about 85 wt %, and as another example about 70 wt % to about 80 wt %, based on a total weight (100 wt %) of the base resin including the polycarbonate resin (A) and the polyethylene terephthalate resin (B) that will be described later. In some embodiments, the base resin may include the polycarbonate resin in an amount of about 70, 71, 72, 73, 74, 75, 76, 77, 78, 79, 80, 81, 82, 83, 84, 85, 86, 87, 88, 89, or 90 wt %. Further, according to some embodiments, the amount of the polycarbonate resin may be in a range from about any of the foregoing amounts to about any other of the foregoing amounts. When the polycarbonate resin is included in an amount within the above ranges, heat resistance and/or impact resistance may be improved and/or viscosity appropriate for blow molding may be exhibited.

(B) Polyethylene Terephthalate Resin

Examples of the polyethylene terephthalate resin may include without limitation a polyethylene terephthalate (PET) homopolymer, a copolymer of polyethylene terephthalate and polytetramethyleneglycol (PTMG), polypropylene glycol (PPG), aliphatic polyester, and/or aliphatic polyamide, and/or a combination thereof.

The polyethylene terephthalate resin may be a polyethylene terephthalate resin waste recycled from polyethylene terephthalate. As used herein, the term waste polyethylene terephthalate refers to a used polyethylene terephthalate resin from, for example, a post-consumer waste PET product such as PET bottles and/or other PET packaging and the like, and may be a waste polyethylene terephthalate resin used more than twice.

The base resin can include the polyethylene terephthalate resin in an amount of about 10 to about 30 wt %, for example about 15 to about 30 wt %, and as another example about 20 to about 30 wt %, based on a total weight (100 wt %) of the base resin including the polycarbonate resin (A) and the polyethylene terephthalate resin (B). In some embodiments, the base resin may include the polyethylene terephthalate resin in an amount of about 10, 11, 12, 13, 14, 15, 16, 17, 18, 19, 20, 21, 22, 23, 24, 25, 26, 27, 28, 29, or 30 wt %. Further, according to some embodiments, the amount of the polyethylene terephthalate resin may be in a range from about any of the foregoing amounts to about any other of the foregoing amounts. When the polyethylene terephthalate resin is included in an amount within the above ranges, the thermoplastic resin composition may exhibit excellent heat resistance, impact resistance, weldability, and/or blow molding formability.

(C) Viscosity Reinforcing Agent (C) The viscosity reinforcing agent is a compound having a core-shell structure including a rubbery polymer core formed by polymerization of a diene-based monomer and a shell formed by grafting at least one monomer different from the diene-based monomer. The shell may be a single layer or a multi-layer including two or more layers.

The thermoplastic resin composition according to an embodiment is intended to be applied to blow molding. Conventionally, when the viscosity of the thermoplastic resin is low during the parison extrusion before the blowing process, the parison may not be suspended stably while maintaining a uniform thickness, may fall due to gravity and/or may cause an uneven thickness, and thus the formability can be deteriorated.

Therefore, in the present embodiment, a viscosity reinforcing agent is added to the thermoplastic resin composition in order to impart a viscosity higher than a certain level to a viscosity suitable for application to a blow molding process including a parison extrusion process. However, if the viscosity reinforcing agent is included in an excessively large amount, it may not be smoothly blown in the blowing process, resulting in a problem of deterioration of formability. Accordingly, an appropriate amount of the viscosity reinforcing agent should be added.

In addition, as described above, the thermoplastic resin composition according to an embodiment includes two resins that form different phases such as the polycarbonate resin (A) and the polyethylene terephthalate resin (B) Therefore, compatibility with these is important.

Accordingly, considering both viscosity and compatibility, (C) the viscosity reinforcing agent according to an embodiment may include (C-1) a first viscosity reinforcing agent having a core-shell structure including a rubbery polymer core and a shell formed by grafting a monomer having compatibility with the polycarbonate resin (A) and being different from the diene-based monomer and (C-2) a second viscosity reinforcing agent having a core-shell structure including a rubbery polymer core and a shell formed by grafting a monomer having compatibility with the polyethylene terephthalate resin (B) and being different from the diene-based monomer.

Hereinafter, the first viscosity reinforcing agent (C-1) and (C-2) the second viscosity reinforcing agent are described in detail.

(C-1) First Viscosity Reinforcing Agent

The first viscosity reinforcing agent (C-1) is a core-shell shaped particle including a rubbery polymer core and a shell formed by grafting a monomer having compatibility with the polycarbonate resin (A) and being different from the diene-based monomer, as described above.

In the rubbery polymer core, the diene-based monomer may be C4 to C6 diene. Examples of the diene can include without limitation butadiene, isoprene, and the like, and combinations thereof, for example, butadiene.

In the shell, the compound having compatibility with the polycarbonate resin (A) and being different from the diene-based monomer may be an acryl-based compound. Examples of the acryl-based compound may include without limitation (meth)acrylate, C1 to C20 alkyl(meth)acrylate, and the like, and combinations thereof.

Examples of the acryl-based compound can include without limitation methyl(meth)acrylate, ethyl(meth)acrylate, n-propyl(meth)acrylate, n-butyl(meth)acrylate, hexyl(meth) acrylate, 2-ethylhexyl(meth)acrylate, lauryl(meth) acrylate, stearyl(meth) acrylate, and the like, and combinations thereof.

The first viscosity reinforcing agent (C-1) may be a core-shell particle including a butadiene rubbery polymer core and a shell formed by grafting methyl(meth)acrylate on the butadiene rubbery polymer core.

The first viscosity reinforcing agent (C-1) can include the rubbery polymer core in an amount of about 40 wt % to about 90 wt %, for example, about 50 wt % to about 80 wt %, based on the total weight (100 wt %) of the first viscosity reinforcing agent (C-1). In some embodiments, the first viscosity reinforcing agent (C-1) may include the rubbery polymer core in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the rubbery polymer core may be in a range from about any of the foregoing amounts to about any other of the foregoing amounts.

Within the above ranges, the thermoplastic resin composition including the first viscosity reinforcing agent (C-1) may exhibit improved heat resistance, impact resistance, weldability, and/or blow molding formability.

The first viscosity reinforcing agent (C-1) may have an average particle diameter of about 50 nm to about 500 nm, for example about 100 nm to about 400 nm, and as another example about 150 nm to about 300 nm.

As used herein, a particle size of the first viscosity reinforcing agent (C-1) (primary particle size) is measured through measurement of particle size distributions based on a dynamic light scattering method (detection method, FFT-heterodyne method). In addition, "average particle diameter" refers to a particle size (median diameter, D50 particle size) corresponding to a cumulative 50% point from a small particle size side in a volume-based particle size distribution obtained through measurement of particle size distributions.

Within the above ranges, the thermoplastic resin composition including the first viscosity reinforcing agent (C-1) may exhibit improved heat resistance, impact resistance, weldability, and/or blow molding formability.

The first viscosity reinforcing agent (C-1) may have a glass transition temperature (Tg) of about −70° C. to about −55° C., for example about −70° C. to about −60° C. Within the above ranges, the thermoplastic resin composition including the viscosity reinforcing agent may exhibit improved heat resistance, impact resistance, weldability, blow molding formability, and the like.

The thermoplastic resin composition can include the first viscosity reinforcing agent (C-1) in an amount of about 1 to about 10 parts by weight based on about 100 parts by weight of the base resin including the polycarbonate resin (A) and the polyethylene terephthalate resin (B). In some embodiments, the thermoplastic resin composition can include the first viscosity reinforcing agent (C-1) in an amount of about 1, 2, 3, 4, 5, 6, 7, 8, 9, or 10 parts by weight based on about 100 parts by weight of the base resin including the polycarbonate resin (A) and the polyethylene terephthalate resin (B). Further, according to some embodiments, the amount of the first viscosity reinforcing agent (C-1) may be in a range from about any of the foregoing amounts to about any other of the foregoing amounts.

Within the above ranges, the thermoplastic resin composition may exhibit improved heat resistance, impact resistance, weldability, and/or blow molding formability.

The thermoplastic resin composition can also include the first viscosity reinforcing agent (C-1) in an amount of about 6 to about 12 parts by weight based on about 100 parts by weight of the polycarbonate resin (A). In some embodiments, the thermoplastic resin composition can include the first viscosity reinforcing agent (C-1) in an amount of about 6, 7, 8, 9, 10, 11, or 12 parts by weight based on about 100 parts by weight of the polycarbonate resin (A). Further, according to some embodiments, the amount of the first viscosity reinforcing agent (C-1) may be in a range from about any of the foregoing amounts to about any other of the foregoing amounts.

When the first viscosity reinforcing agent (C-1) is added in an amount of less than about 6 parts by weight based on about 100 parts by weight of the polycarbonate resin (A), viscosity enforcing effects for the polycarbonate resin (A) may not be exhibited, and when the first viscosity reinforcing agent (C-1) is added in an amount of greater than about 12 parts by weight based on about 100 parts by weight of the polycarbonate resin (A), heat resistance and/or dimensional stability may be deteriorated.

(C-2) Second Viscosity Reinforcing Agent

The second viscosity reinforcing agent (C-2) is a core-shell shaped particle including a rubbery polymer core and a shell formed by grafting a monomer having compatibility with the polyethylene terephthalate resin (B) and being different from the diene-based monomer, as described above.

In the rubbery polymer core, the diene-based monomer may be C4 to C6 diene. Examples of the diene can include without limitation butadiene, isoprene, and the like, and combinations thereof, for example, butadiene.

In the shell, the compound having compatibility with the polyethylene terephthalate resin (B) and being different from the diene-based monomer may include an aromatic vinyl compound and a vinyl cyanide compound. Accordingly, the second viscosity reinforcing agent (C-2) can be a core-shell particle including a rubbery polymer core and a shell formed by grafting a copolymer of an aromatic vinyl compound and a vinyl cyanide compound thereon.

Examples of the aromatic vinyl compound include without limitation styrene, C1 to C10 alkyl-substituted styrene, halogen-substituted styrene, vinyl toluene, vinyl naphthalene, and the like, and combinations thereof. Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and combinations thereof.

Examples of the vinyl cyanide compound include without limitation acrylonitrile, methacrylonitrile, fumaronitrile, and the like, and combinations thereof.

Examples of the aromatic vinyl-vinyl cyanide copolymer include without limitation a styrene-acrylonitrile copolymer; a α-methyl styrene-acrylonitrile copolymer; and/or a copolymer of styrene, α-methyl styrene-acrylonitrile, for example a styrene-acrylonitrile copolymer. For example, the aromatic vinyl-vinyl cyanide copolymer may be a styrene-acrylonitrile copolymer (SAN) where about 60 wt % to about 75 wt % of styrene and about 25 wt % to about 40 wt % of acrylonitrile are copolymerized. The styrene-acrylonitrile copolymer (SAN) can have a weight average molecular weight of about 100,000 g/mol to about 300,000 g/mol.

The second viscosity reinforcing agent (C-2) may be made in a form of a particle having a core-shell structure by graft-polymerizing an aromatic vinyl-vinyl cyanide copolymer, such as a styrene-acrylonitrile copolymer, on a rubbery polymer core and forming a shell including an aromatic vinyl (such as styrene) repeating unit and a vinyl cyanide (such as an acrylonitrile) repeating unit. Herein, the polymerization may be performed by a known polymerization method such as emulsion polymerization, suspension polymerization, mass polymerization, and the like.

The second viscosity reinforcing agent (C-2) can have an average particle diameter of about 50 nm to about 500 nm, for example about 100 nm to about 400 nm, and as another example about 150 nm to about 300 nm.

As discussed herein with regard to the average particle diameter of the first viscosity reinforcing agent (C-1), a particle size of the second viscosity reinforcing agent (C-2) (primary particle size) is also measured through measurement of particle size distributions based on a dynamic light scattering method (detection method, FFT-heterodyne method). In addition, "average particle diameter" refers to a particle size (median diameter, D50 particle size) corresponding to a cumulative 50% point from a small particle size side in a volume-based particle size distribution obtained through measurement of particle size distributions.

Within the above ranges, the thermoplastic resin composition including the second viscosity reinforcing agent (C-2) may exhibit improved heat resistance, impact resistance, weldability, and/or blow molding formability.

The thermoplastic resin composition can include the second viscosity reinforcing agent (C-2) in an amount of about 1 to about 10 parts by weight based on about 100 parts by weight of the base resin including the polycarbonate resin (A) and the polyethylene terephthalate resin (B). In some embodiments, the thermoplastic resin composition can include the second viscosity reinforcing agent (C-2) in an amount of about 1, 2, 3, 4, 5, 6, 7, 8, 9, or 10 parts by weight based on about 100 parts by weight of the base resin including the polycarbonate resin (A) and the polyethylene terephthalate resin (B). Further, according to some embodiments, the amount of the second viscosity reinforcing agent (C-2) may be in a range from about any of the foregoing amounts to about any other of the foregoing amounts.

Within the above ranges, the thermoplastic resin composition may exhibit improved heat resistance, impact resistance, weldability, and/or blow molding formability.

The thermoplastic resin composition can also include the second viscosity reinforcing agent (C-2) in an amount of about 10 parts by weight to about 30 parts by weight based on about 100 parts by weight of the polyethylene terephthalate resin (B). In some embodiments, the thermoplastic resin composition can include the second viscosity reinforcing agent (C-2) in an amount of about 10, 11, 12, 13, 14, 15, 16, 17, 18, 19, 20, 21, 22, 23, 24, 25, 26, 27, 28, 29, or 30 parts by weight based on about 100 parts by weight of the polyethylene terephthalate resin (B). Further, according to some embodiments, the amount of the second viscosity reinforcing agent (C-2) may be in a range from about any of the foregoing amounts to about any other of the foregoing amounts.

When the second viscosity reinforcing agent (C-2) is added in an amount of less than about 10 parts by weight based on about 100 parts by weight of the polyethylene terephthalate resin (B), viscosity enforcing effects for the polyethylene terephthalate resin (B) may not be exhibited, and when the second viscosity reinforcing agent (C-2) is added in an amount of greater than about 30 parts by weight based on about 100 parts by weight of the polyethylene terephthalate resin (B), formability may be deteriorated due to excessively high viscosity.

(D) Alkyl Acrylate Copolymer Including Glycidyl Methacrylate Functional Group

The alkyl acrylate copolymer (D) including the glycidyl methacrylate (GMA) functional group is an alkyl acrylate copolymer wherein a part of the polymer is modified by a glycidyl methacrylate functional group.

The alkyl acrylate copolymer (D) including the glycidyl methacrylate functional group is used to reinforce viscosity of the thermoplastic resin composition additionally. As described above, the thermoplastic resin composition according to an embodiment is intended to be used in a blow molding process, and in order to prevent defects when performing the parison extrusion process before the blowing process and not to prevent formability during the in the blowing process, it is necessary to have an appropriate viscosity. Therefore, the thermoplastic resin composition according to an embodiment further includes the alkyl acrylate copolymer (D) including the glycidyl methacrylate functional group in addition to the viscosity reinforcing agent (C) described above.

The alkyl acrylate copolymer (D) including the glycidyl methacrylate functional group may also reinforce welding properties of the thermoplastic resin composition. In the junction process that proceeds after the blowing process, the high impact properties may be strengthened at the junction part.

Herein, an amount of the glycidyl methacrylate functional group may be about 0.01 wt % to about 0.03 wt % based on a total weight (100 wt %) of the thermoplastic resin composition. When an amount of the glycidyl methacrylate functional group is less than about 0.01% by weight, the compatibility with the thermoplastic resin composition may be decreased. When an amount of the glycidyl methacrylate functional group is greater than about 0.03% by weight, various side reactions may occur to deteriorate the performance of the thermoplastic resin composition.

Examples of the alkyl acrylate copolymer (D) including the glycidyl methacrylate functional group may include without limitation an ethylene-normal butylacrylate-glycidylmethacrylate copolymer, an ethylene-glycidylmethacrylate copolymer, an ethylene-acrylic ester-glycidylmethacrylate copolymer, an ethylene-methyl acrylate-glycidylmethacrylate copolymer, an ethylene-dimethacrylate-glycidylmethacrylate copolymer, an ethylene-acrylate-glycidylmethacrylate copolymer, an ethylene-vinylacetate-glycidylmethacrylate copolymer, and the like, and combinations thereof.

The alkyl acrylate copolymer (D) including the glycidyl methacrylate functional group may be a glycidyl methacrylate modified ethylene-alkylacrylate copolymer that is a terpolymer of ethylene, alkyl acrylate, and glycidyl methacrylate.

The glycidyl methacrylate modified ethylene-alkylacrylate copolymer can include an ethylene component in an amount of about 5 wt % to about 60 wt % based on a total weight (100 wt %) of the glycidyl methacrylate modified ethylene-alkylacrylate copolymer. In some embodiments, the glycidyl methacrylate modified ethylene-alkylacrylate copolymer can include the ethylene component in an amount of about 5, 6, 7, 8, 9, 10, 11, 12, 13, 14, 15, 16, 17, 18, 19, 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the ethylene component may be in a range from about any of the foregoing amounts to about any other of the foregoing amounts.

The glycidyl methacrylate modified ethylene-alkylacrylate copolymer can include alkyl acrylate in an amount of about 10 wt % to about 60 wt % based on a total weight (100 wt %) of the glycidyl methacrylate modified ethylene-alkylacrylate copolymer. In some embodiments, the glycidyl methacrylate modified ethylene-alkylacrylate copolymer can include alkyl acrylate in an amount of about 10, 11, 12, 13, 14, 15, 16, 17, 18, 19, 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the alkyl acrylate may be in a range from about any of the foregoing amounts to about any other of the foregoing amounts.

The glycidyl methacrylate modified ethylene-alkylacrylate copolymer can include a glycidyl methacrylate component in an amount of about 1 wt % to about 50 wt % based on a total weight (100 wt %) of the glycidyl methacrylate modified ethylene-alkylacrylate copolymer. In some embodiments, the glycidyl methacrylate modified ethylene-alkylacrylate copolymer can include the glycidyl methacrylate component in an amount of about 1, 2, 3, 4, 5, 6, 7, 8, 9, 10, 11, 12, 13, 14, 15, 16, 17, 18, 19, 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the glycidyl methacrylate component may be in a range from about any of the foregoing amounts to about any other of the foregoing amounts.

The thermoplastic resin composition can include the alkyl acrylate copolymer (D) including the glycidyl methacrylate functional group in an amount of about 1 to about 10 parts by weight based on about 100 parts by weight of the base resin including the polycarbonate resin (A) and the polyethylene terephthalate resin (B). In some embodiments, the thermoplastic resin composition can include the alkyl acrylate copolymer (D) including the glycidyl methacrylate functional group in an amount of about 1, 2, 3, 4, 5, 6, 7, 8, 9, or 10 parts by weight based on about 100 parts by weight of the base resin including the polycarbonate resin (A) and the polyethylene terephthalate resin (B). Further, according to some embodiments, the amount of the alkyl acrylate copolymer (D) including the glycidyl methacrylate functional group may be in a range from about any of the foregoing amounts to about any other of the foregoing amounts.

When the alkyl acrylate copolymer (D) including the glycidyl methacrylate functional group is included in an amount within the above ranges, the viscosity of the thermoplastic resin composition may be controlled and/or formability may be improved as described above and/or the characteristics at the junction part may be reinforced.

(E) Other Additives

The thermoplastic resin composition may further include one or more additives optionally in accordance with its use. Examples of the additives may include without limitation flame retardants, lubricants, plasticizers, heat stabilizers, antioxidants, light stabilizers, and/or colorants. The additives can be used singly and/or two or more kinds of additives may be mixed in accordance with characteristics of final molded products.

The flame retardant is a material for reducing flammability. Examples of the flame retardant may include without limitation a phosphate compound, a phosphite compound, a phosphonate compound, a polysiloxane, a phosphazene compound, a phosphinate compound, and/or a melamine compound.

The lubricant plays a role of smoothening the surface of a metal contacting with the thermoplastic resin composition during the process/molding/extrusion and thus helping a flow or movement of the thermoplastic resin composition.

The plasticizer may be generally used to increase flexibility, process workability, and/or expansion property of the thermoplastic resin composition and may be any generally-used materials.

The heat stabilizer may suppress a thermal decomposition of the thermoplastic resin composition when kneaded or molded at a high temperature and may be any generally-used materials.

The antioxidant may suppress and/or block a chemical reaction of the thermoplastic resin composition with oxygen and thus prevent decomposition of the thermoplastic resin composition and loss of its inherent properties. Examples of the antioxidant can include without limitation phenol-type, phosphate-type, thioether-type, and/or amine-type antioxidants.

The light stabilizer suppresses and/or blocks decomposition of the thermoplastic resin composition from ultraviolet (UV) and thus its color change and/or mechanical property loss. Examples of the light stabilizer can include without limitation hindered phenol type, benzophenone type, and/or benzotriazole type light stabilizers.

The colorant may include a general pigment and/or dye.

The additives may be included in an amount of about 0.1 parts by weight to 15 parts by weight based on about 100 parts by weight of the thermoplastic resin composition.

The thermoplastic resin composition according to the present disclosure may be prepared in a well-known method of preparing a thermoplastic resin composition.

For example, the thermoplastic resin composition according to the present disclosure may be manufactured into a pellet by mixing the above components and optionally other additive(s) simultaneously and melt-kneading the same in an extruder.

The molded product according to an embodiment may be produced from the thermoplastic resin composition described above. The thermoplastic resin composition can exhibit stable blow molding formability and may have improved welding properties to realize a high impact property at the junction part, so that it may be used to manufacture a molded product through a blow molding process, without limitation.

Hereinafter, the present invention is illustrated in more detail with reference to examples and comparative examples. However, the following examples and comparative examples are provided for the purpose of illustration only and the present invention is not limited thereto.

Example 1 to Example 4 and Comparative Example 1 to Comparative Example 4

The polycarbonate resin compositions according to Example 1 to Example 4 and Comparative Example 1 to Comparative Example 4 are respectively prepared according to a content ratio of components shown in Table 1.

In Table 1, the constituent elements (A) and (B) of the base resin are represented by wt % based on a total weight of the base resin, and (C-1), (C-2), and (D) added to the base resin are expressed by parts by weight with respect to 100 parts by weight of the base resin.

In addition to the components in Table 1, commonly used additives are added in an amount of 2.0 parts by weight or less based on 100 parts by weight of the base resin, and the mixture is melted, kneaded, and extruded to produce pellets. Extrusion is performed using a twin-screw extruder having an L/D of 29 and a diameter of 45 mm, and the barrel temperature is set at 220° C.

The prepared pellets are dried at 80° C. for 2 hours, and then specimens of 9 cm×5 cm×0.2 cm for measurement of physical properties are prepared. Herein, a 6 oz injection molding machine is used, and the cylinder temperature is set at 250° C. and the mold temperature is set at 60° C.

TABLE 1

|  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| (A) polycarbonate resin | 70 | 90 | 70 | 70 | 70 | 70 | 60 | 70 |
| (B) polyethylene terephthalate resin | 30 | 10 | 30 | 30 | 30 | 30 | 40 | 30 |
| (C-1) first viscosity reinforcing agent | 6 | 7 | 3 | 8 | 6 | — | 5 | 6 |
| (C-2) second viscosity reinforcing agent | 4 | 1 | 9 | 6 | — | 4 | 5 | 4 |
| (D) alkyl acrylate copolymer including a glycidyl methacrylate functional group | 6 | 3 | 6 | 6 | 6 | 6 | 6 | — |

The description of each component shown in Table 1 is as shown in Table 2 below.

TABLE 2

|  | Component | Manufacturer | Tradename | Average particle diameter (nm) |
|---|---|---|---|---|
| (A) polycarbonate resin | branched polycarbonate resin | Idemitsu-Kosan | FB2200J | — |
| (B) polyethylene terephthalate resin | Polyethylene terephthalate resin (intrinsic viscosity 0.76 dL/g) | Lotte Chemical Corp. | BCN76 | — |
| (C-1) first viscosity reinforcing agent | core-shell structure copolymer including methylmethacrylate grafted on a butadiene rubbery polymer core | Kaneka | — | 300-350 |
| (C-2) second viscosity reinforcing agent | core-shell structure copolymer including styrene and acrylonitrile grafted on a butadiene rubbery polymer core | Lotte Advanced Materials Co., Ltd. | — | 230-280 |

TABLE 2-continued

| Component | | Manufacturer | Tradename | Average particle diameter (nm) |
|---|---|---|---|---|
| (D) alkyl acrylate copolymer including a glycidyl methacrylate functional group | ethylene-methyl acrylate copolymer including a glycidyl methacrylate functional group (glycidyl methacrylate functional group 0.4 wt %) | DuPont | — | — |

Experimental Examples

The results of the experiment are shown in Table 3.

(1) Junction strength: ⅛-inch thick Izod impact strength test specimens are formed by injection molding with a gate mold at both ends to form a weld at the center of the specimens, and measuring Izod impact strengths (unit: kgf·cm/cm) according to ASTM D256.

(2) Heat resistance: Heat distortion temperature (HDT, unit: ° C.) is measured under a load of 1.8 MPa according to ASTM D648.

(3) Blow molding formability: Based on whether or not the parison is maintained at a uniform thickness at the end of the die for 5 seconds or more while blow molding. ⊚: holding for 5 seconds or more, Δ: holding for 3 seconds to less than 5 seconds, and X: holding for less than 3 seconds.

TABLE 3

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Izod Impact strength (weld forming) | 23 | 25 | 22 | 23 | 24 | 10 | 10 | 7 |
| Heat deformation temperature | 115 | 117 | 115 | 114 | 115 | 115 | 100 | 115 |
| Blow molding formability | ⊚ | ⊚ | ⊚ | ⊚ | Δ | Δ | X | X |

From Tables 1 and 3, the base resin including the polycarbonate resin (A), and the polyethylene terephthalate resin (B) and as additives, the first viscosity reinforcing agent (C-1) having the core-shell structure including the rubbery polymer core formed by polymerization of the diene-based monomer and the monomer having compatibility with the polycarbonate resin (A) and being different from the diene-based monomer is grafted thereon to form the shell, the second viscosity reinforcing agent (C-2) having the core-shell structure including the rubbery polymer core formed by polymerization of the diene-based monomer and the shell formed by grafting a monomer having compatibility with the polyethylene terephthalate resin (B) and being different from the diene-based monomer, and the alkyl acrylate copolymer (D) including the glycidyl methacrylate functional group are used in optimal amounts, and thereby can exhibit stable blow molding formability and also can have reinforced welding properties to provide high impact characteristics at the junction part.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising:
   about 100 parts by weight of a base resin comprising:
   (A) about 70 wt % to about 90 wt % of a polycarbonate resin; and
   (B) about 10 wt % to about 30 wt % of a polyethylene terephthalate resin,
   (C-1) about 1 to about 10 parts by weight of a first viscosity reinforcing agent having a core-shell structure comprising a rubbery polymer core formed by polymerization of a diene-based monomer and a shell formed by grafting a monomer consisting of an acryl-based compound;
   (C-2) about 1 to about 10 parts by weight of a second viscosity reinforcing agent having a core-shell structure comprising a rubbery polymer core formed by polymerization of a diene-based monomer and a shell formed by grafting a monomer consisting of an aromatic vinyl compound and a vinyl cyanide compound; and
   (D) about 1 to about 10 parts by weight of an alkyl acrylate copolymer comprising a functional group derived from glycidyl methacrylate.

2. The thermoplastic resin composition of claim 1, wherein the polycarbonate resin (A) is a branched polycarbonate resin.

3. The thermoplastic resin composition of claim 1, wherein the polyethylene terephthalate resin (B) comprises a polyethylene terephthalate (PET) homopolymer, a copolymer of polyethylene terephthalate and polytetramethyleneglycol (PTMG), polypropylene glycol (PPG), aliphatic polyester, and/or aliphatic polyamide, and/or a combination thereof.

4. The thermoplastic resin composition of claim 1, wherein the diene-based monomer of the first viscosity reinforcing agent (C-1) comprises a C4 to C6 diene-based compound.

5. The thermoplastic resin composition of claim 1, wherein the acryl-based compound comprises methyl(meth)acrylate, ethyl(meth)acrylate, n-propyl(meth)acrylate, n-butyl(meth)acrylate, hexyl(meth)acrylate, 2-ethylhexyl(meth)acrylate, lauryl(meth) acrylate, stearyl(meth) acrylate, and/or a combination thereof.

6. The thermoplastic resin composition of claim 1, wherein the first viscosity reinforcing agent (C-1) is a core-shell particle comprising a butadiene rubbery polymer core and a shell formed by grafting methyl(meth)acrylate on the butadiene rubbery polymer core.

7. The thermoplastic resin composition of claim 1, wherein
in the first viscosity reinforcing agent (C-1),
an amount of the rubbery polymer core is about 40 wt % to about 90 wt %.

8. The thermoplastic resin composition of claim 1, comprising the first viscosity reinforcing agent (C-1) in an amount of about 6 to about 12 parts by weight per about 100 parts by weight of the polycarbonate resin (A).

9. The thermoplastic resin composition of claim 1, wherein the diene-based monomer of (C-2) the second viscosity reinforcing agent comprises a C4 to C6 diene-based compound.

10. The thermoplastic resin composition of claim 1, wherein the aromatic vinyl compound comprises styrene, C1 to C10 alkyl-substituted styrene, halogen-substituted styrene, vinyl toluene, vinyl naphthalene, and/or a combination thereof.

11. The thermoplastic resin composition of claim 1, wherein the vinyl cyanide compound comprises acrylonitrile, methacrylonitrile, fumaronitrile, and/or a combination thereof.

12. The thermoplastic resin composition of claim 1, wherein (C-2) the second viscosity reinforcing agent comprises a core-shell particle comprising a butadiene rubbery polymer core and a shell formed by grafting a styrene-acrylonitrile copolymer on the butadiene rubbery polymer core.

13. The thermoplastic resin composition of claim 1, comprising the second viscosity reinforcing agent (C-2) in an amount of about 10 to about 30 parts by weight based on about 100 parts by weight of the polyethylene terephthalate resin (B).

14. The thermoplastic resin composition of claim 1, wherein the first viscosity reinforcing agent (C-1) and the second viscosity reinforcing agent (C-2) each have an average particle diameter of about 50 nm to about 500 nm.

15. The thermoplastic resin composition of claim 1, wherein the alkyl acrylate copolymer (D) comprising a functional group derived from glycidyl methacrylate comprises a glycidyl methacrylate modified ethylene-alkylacrylate copolymer.

16. The thermoplastic resin composition of claim 1, comprising the glycidyl methacrylate functional group in an amount of about 0.01 wt % to about 0.03 wt % based on the total weight (100 wt %) of the thermoplastic resin composition.

17. A molded product comprising the thermoplastic resin composition of claim 1.

* * * * *